United States Patent
Aoki et al.

(10) Patent No.: US 10,358,161 B2
(45) Date of Patent: Jul. 23, 2019

(54) STEERING CONTROLLER

(71) Applicant: DENSO CORPORATION, Kariya, Aichi-pref. (JP)

(72) Inventors: Takashi Aoki, Kariya (JP); Motoaki Kataoka, Kariya (JP); Yosuke Hirate, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 101 days.

(21) Appl. No.: 15/346,608

(22) Filed: Nov. 8, 2016

(65) Prior Publication Data

US 2017/0137056 A1    May 18, 2017

(30) Foreign Application Priority Data

Nov. 13, 2015  (JP) ................................ 2015-222984
May 18, 2016  (JP) ................................ 2016-99410

(51) Int. Cl.
| | |
|---|---|
| *B62D 5/04* | (2006.01) |
| *B62D 6/00* | (2006.01) |
| *B62D 6/10* | (2006.01) |
| *B62D 15/02* | (2006.01) |

(52) U.S. Cl.
CPC ......... *B62D 5/0463* (2013.01); *B62D 5/0466* (2013.01); *B62D 6/008* (2013.01); *B62D 6/10* (2013.01); *B62D 15/0225* (2013.01)

(58) Field of Classification Search
CPC ............................... B62D 5/0463; B62D 6/10
USPC .......................................................... 701/42
See application file for complete search history.

(56) References Cited

U.S. PATENT DOCUMENTS

| | | | | |
|---|---|---|---|---|
| 9,855,967 | B2* | 1/2018 | Hirate ................. | B62D 5/0463 |
| 9,889,879 | B2* | 2/2018 | Namikawa .......... | B62D 5/0463 |
| 2006/0086560 | A1* | 4/2006 | Furusho .............. | B62D 5/0463 |
| | | | | 180/446 |
| 2007/0219691 | A1* | 9/2007 | Fukuba ............... | B62D 6/008 |
| | | | | 701/42 |
| 2013/0289826 | A1* | 10/2013 | Yoshitake ............ | B62D 5/049 |
| | | | | 701/42 |
| 2015/0232120 | A1* | 8/2015 | Aono .................. | B62D 5/0463 |
| | | | | 701/42 |
| 2015/0353124 | A1* | 12/2015 | Chai ................... | B62D 6/008 |
| | | | | 701/41 |

(Continued)

FOREIGN PATENT DOCUMENTS

JP       2014-213781 A     11/2014

*Primary Examiner* — Krishnan Ramesh
(74) *Attorney, Agent, or Firm* — Knobbe, Martens, Olson & Bear, LLP

(57) ABSTRACT

A steering controller that controls a motor to output an assist torque to steer a steering member, including a steer property calculator calculating a steer state quantity that is an index of a steering state indicating one of (i) a steer-away state, (ii) a steer-back state, or (iii) a stay-still state, an adjusted torque calculator calculating an adjusted torque based on the steer state quantity, and an instruction value calculator calculating an assist torque instruction that is an instruction value regarding a drive of the motor by using the adjusted torque. In such manner, the steer state quantity, the steer-back operation, the stay-still operation of a steering wheel, and the adjusted torque are appropriately calculated, thereby enabling an appropriate adjustment of a steering feel.

13 Claims, 10 Drawing Sheets

(56) References Cited

U.S. PATENT DOCUMENTS

| | | | |
|---|---|---|---|
| 2015/0353126 A1* | 12/2015 | Chai | B62D 6/008 |
| | | | 701/42 |
| 2016/0107679 A1* | 4/2016 | Kimura | B62D 5/0463 |
| | | | 701/42 |
| 2017/0137055 A1* | 5/2017 | Hirate | B62D 5/0463 |

* cited by examiner

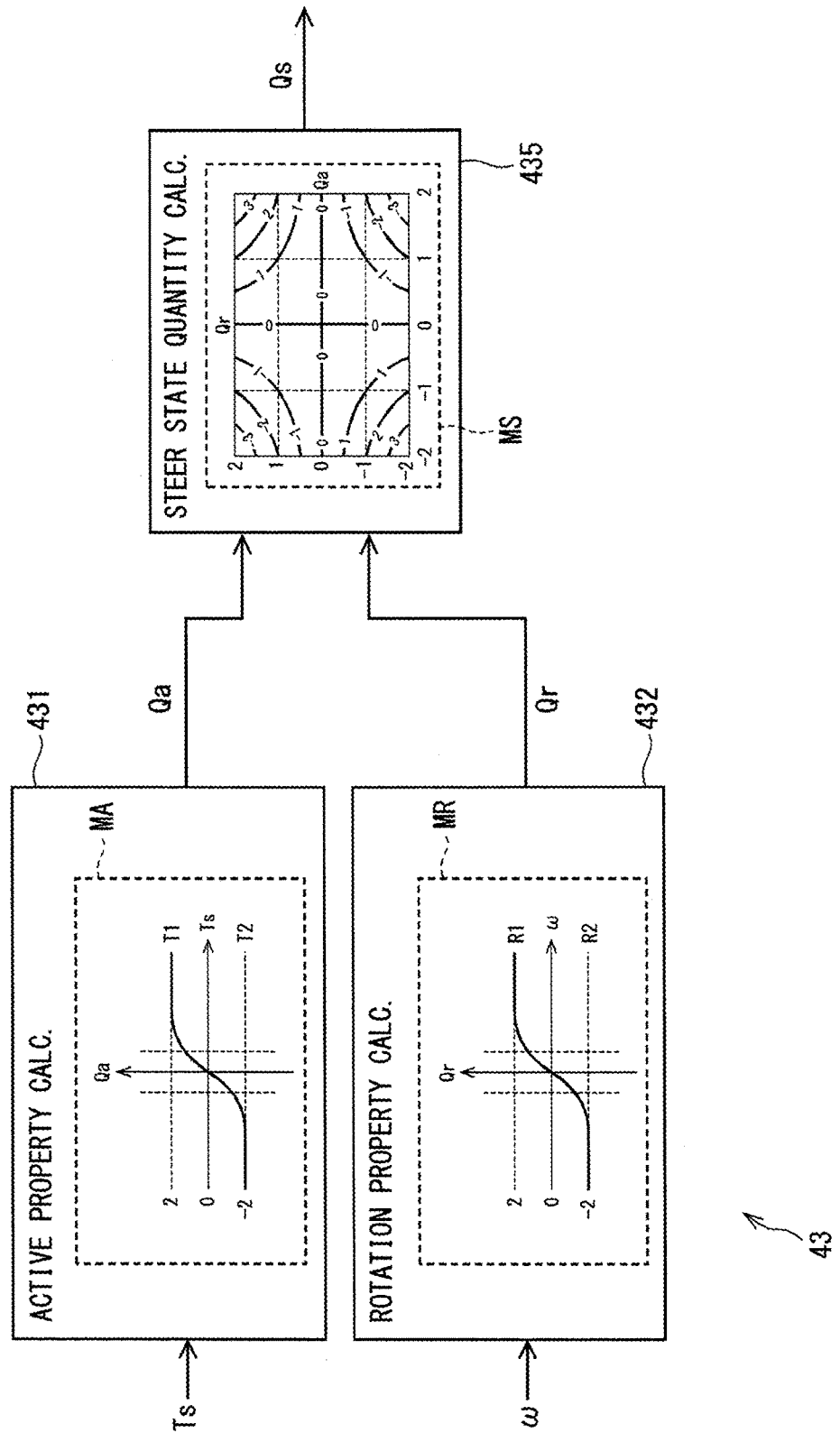

STEERING CONTROLLER

CROSS REFERENCE TO RELATED APPLICATION

The present application is based on and claims the benefit of priority of Japanese Patent Applications No. 2015-222984, filed on Nov. 13, 2015, and No. 2016-99410, filed on May 18, 2016, the disclosure of which are incorporated herein by reference.

TECHNICAL FIELD

The present disclosure generally relates to a steering controller.

BACKGROUND INFORMATION

Conventionally, a feedback feel from the steering wheel for conveying the steering state of the steering member is realized by a steering controller. That is, for example, a patent document, Japanese Patent Laid-Open No. 2014-213781 (Patent document 1) listed below discloses a change scheme that changes a rigidity component, a viscosity component, and an inertia component respectively used for torque generation according to a driver power rate, which is defined by a product of a steering torque and an angular speed of the steering shaft. More practically, for the mechanical impedance adjustment, an adjust torque is generated by changing those components according to the driver power rate.

Due to the lax response, i.e., a slow rise characteristics, of the driver power rate, which is caused by the mechanical backlash at a steer start time, e.g., loose connection and/or play between the components in the steering member slowly responding to the move of the steering mechanism on one end, the determination of switching between a steer-still state (i.e., staying at a steering wheel neutral/center position), a steer-away state (i.e., steering away from the neutral position) and a steer-back state (i.e., steering back to the neutral position) may be delayed from an actual switching of those states. Further, the driver power state tends to have a smaller value in the steer-back state than in the steer-away state. Therefore, when the driver power rate is used for the adjustment of the mechanical impedance factor, it may be difficult to adjust the mechanical impedance factor to an appropriate amount/quantity without delay from the change of state of the steering member.

SUMMARY

It is an object of the present disclosure to provide a steering controller that is capable of realizing a steering feel that is true to the steering state of the steering member.

In an aspect of the present disclosure, a steering controller that controls a motor to output an assist torque, and a steering operation of a steering member that is connected to a steering shaft by an application of a steering toque and an application of the assist torque. The steering controller includes a steer property calculator calculating a steer state quantity that is an index of a steering state based on (a) an active property (Qa) indicating an application direction of a steering torque (Ts) that is applied to the steering shaft, and (b) a rotation property (Qr) indicating a rotation direction of the steering shaft. The index of the steering state indicates one of (i) a steer-away state, (ii) a steer-back state, and (iii) a stay-still state. The steering controller also includes a compensation value calculator calculating an instruction compensation value based on the steer state quantity, and an instruction value calculator calculating an instruction value regarding a drive of the motor by using the instruction compensation value. At least one of the active property and the rotation property is a conversion value that is calculated by converting a physical quantity representing a motion state of the steering shaft by using a function or a map.

For the calculation of the steer state quantity, at least one of the active property or an actively-input quantity indicative of the steering operation and the rotation property, or an actually-output quantity indicative of a result of the steering operation is set/prepared (i.e., calculated) as the conversion value, instead of setting them as the "direct" physical quantity that represents the motion (i.e., operation) state of the steering shaft. Such a conversion value acquires adjustability, i.e., can include an adjustment factor. Therefore, the steer state quantity i.e., the index indicative of which one of the three steer states the steering mechanism is currently in, is calculated as an appropriate value. Further, based on the steer state quantity, the instruction compensation value is appropriately calculable according to the steering state of the steering member, thereby enabling an appropriate adjustment of the steering feel.

BRIEF DESCRIPTION OF THE DRAWINGS

Objects, features, and advantages of the present disclosure will become more apparent from the following detailed description made with reference to the accompanying drawings, in which:

FIG. 9 is a block diagram of the steer property calculator in a second embodiment of the present disclosure;

DETAILED DESCRIPTION

Hereafter, the steering controller of the present disclosure is described based on the drawings. The same numerals are assigned to the same or to the substantially-same components/configurations in the following embodiments, thereby not repeating the same description.

First Embodiment

The steering controller in the first embodiment of the present disclosure is shown in FIGS. 1-8.

Figure 1:
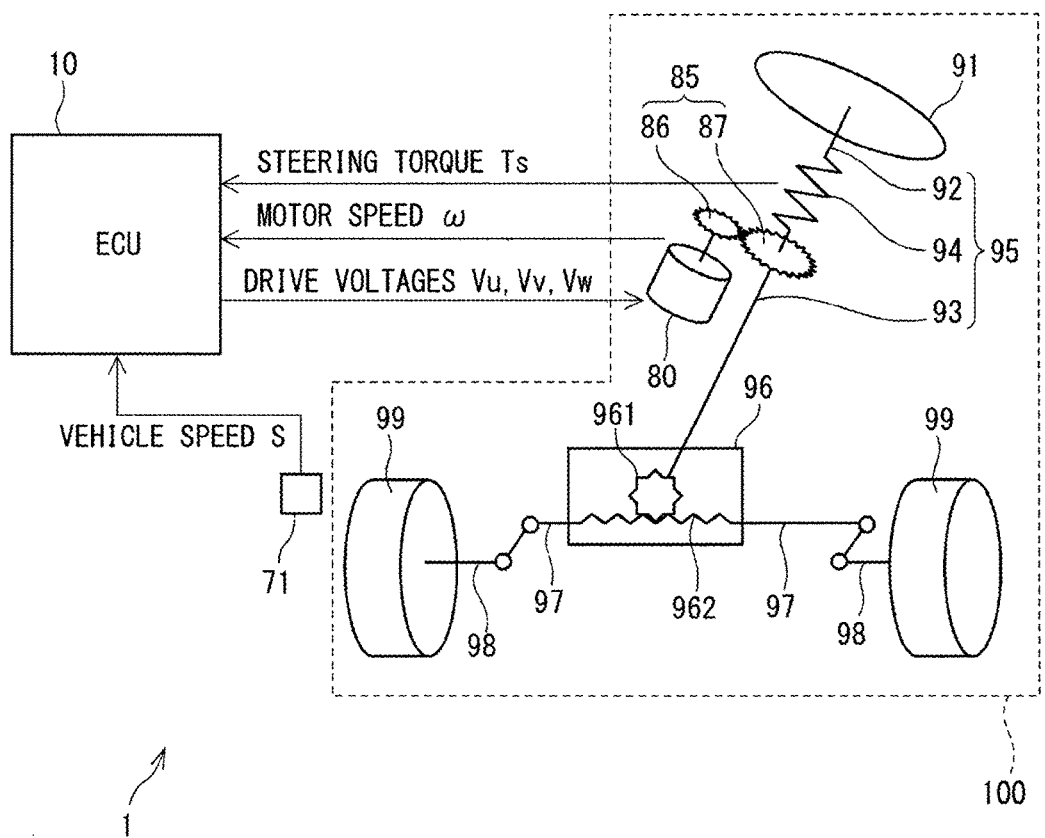
FIG. 1 is a block diagram of a steering system in a first embodiment of the present disclosure.

As shown in FIG. 1, a steering system 1 assists a steering operation of a steering wheel 91 that serves as a steering member by the driver of a vehicle by using a motor 80. The steering system 1 is provided with the steering wheel 91, a steering shaft 95, a gearbox 96, steered tires 99, the motor 80, an Electronic Control Unit (ECU) 10 and the like.

The steering wheel 91 is attached to one end of an upper steering shaft 92. An intermediate shaft 93 is provided, i.e., attached, for the other end of the upper steering shaft 92. A torque sensor 94 is provided at a position between the upper steering shaft 92 and the intermediate shaft 93. The steering shaft 92 and the intermediate shaft 93 are connected by a torsion bar of the torque sensor 94.

Hereafter, the upper steering shaft 92 and the intermediate shaft 93 together with the torque sensor 94 are collectively designated as the steering shaft 95.

The torque sensor 94 is a sensor for detecting a steering torque Ts. More practically, the torque sensor 94 has the torsion bar that connects the upper steering shaft 92 and the intermediate shaft 93, and, detects the torque currently applied to the torsion bar based on a twist angle of the torsion bar. The detection value of the torque sensor 94 is outputted to the ECU 10 as a detection value concerning the steering torque Ts.

The gearbox 96 is provided on an opposite end of the intermediate shaft 93 relative to the torque sensor 94. The gearbox 96 includes a pinion gear 961 and a rack 962. The pinion gear 961 is provided for an opposite end of the intermediate shaft 93 relative to the torque sensor 94, and engages with the gear tooth of the rack 962.

When the driver turns, i.e., rotates, the steering wheel 91, the pinion gear 961 rotates with the intermediate shaft 93, and the rack 962 moves to the right or to the left with the rotation of the pinion gear 961.

A tie rod 97 is provided on both ends of the rack 962. The tie rod 97 reciprocally moves together with the rack 962. The tie rod 97 is connected with the steered tires 99 via a knuckle arm 98. When the tie rod 97 pulls or pushes the knuckle arm 98, the steered tires 99 change the direction, i.e., are steered.

The motor 80 outputs an assist torque that assists a steering force of the steering wheel 91. Rotation of the motor 80 is transmitted to the intermediate shaft 93 via a deceleration mechanism 85. That is, the steering system 1 of the present embodiment is a so-called "column assist type" in which rotation of the motor 80 is transmitted to the steering shaft 95.

The deceleration mechanism 85 has a worm gear 86 and a worm wheel 87. The worm gear 86 is provided on a tip of a rotation shaft of the motor 80. The worm wheel 87 is provided coaxially with the intermediate shaft 93 in an engaged state with the worm gear 86. Thereby, rotation of the motor 80 is transmitted to the intermediate shaft 93.

When the intermediate shaft 93 rotates due to steering of the steering wheel 91 or due to the reaction force from the road surface, the rotation is then transmitted back to the motor 80 via deceleration mechanism 85, and the motor 80 is rotated by such reaction force or the like.

The motor 80 of the present embodiment is a brushless motor of three-phase alternate electric current. Three phases of the motor 80, i.e., U phase, V phase and W phase, respectively receive a drive voltage, i.e., Vu, Vv, and Vw.

The motor 80 is provided with a rotation sensor that is not illustrated. The rotation sensor is a resolver, for example, which detects the rotation state of the motor 80 and outputs the detection value concerning the rotation state to the ECU 10.

In the present embodiment, the rotation sensor outputs to the ECU 10 a motor speed ω that is the information indicative of the angular speed of rotation of the motor 80. The rotation sensor may also be a rotational angle sensor that detects a rotation angle of the motor 80, and the motor speed ω may be calculated in the ECU 10 based on the detection value of the rotational angle sensor. The motor speed ω may be converted to the rotation speed of the steering shaft 95 based on the gear ratio of the deceleration mechanism 85. Hereafter, the rotation speed of the steering shaft 95 may also be designated as a "steering speed".

In the present embodiment, a steering force transmission structure from the steering wheel 91 to the steered tires 99 including the motor 80 and the deceleration mechanism 85 is designated as a steering system mechanism 100.

Now, the steering torque Ts rotating the steering wheel 91 to the left is designated as a positive torque, and the steering torque Ts rotating the steering wheel 91 to the right is designated as a negative torque. Further, the motor speed ω is positive when the steering wheel 91 is rotated to the left, and the motor speed ω is negative when the steering wheel 91 is rotated to the right (i.e., opposite that of the left rotation of the steering wheel 91).

In other words, the "first" direction is defined as a left turn direction of the steering wheel 91, and the "second" direction is defined as a right turn direction of the steering wheel 91. Such directions may also be reversely defined.

The ECU 10 controls the steering system mechanism 100 by controlling the drive of the motor 80. The ECU 10 operates with the electric power from the in-vehicle battery that is not illustrated, and calculates an assist torque instruction Ta* based on the steering torque Ts detected by the torque sensor 94, the motor speed ω detected by the rotation sensor, a vehicle speed S, i.e., a travel speed of the vehicle, detected by a vehicle speed sensor 71, etc. Further, the ECU 10 controls the drive of the motor 80 based on the assist torque instruction Ta*.

Figure 2:
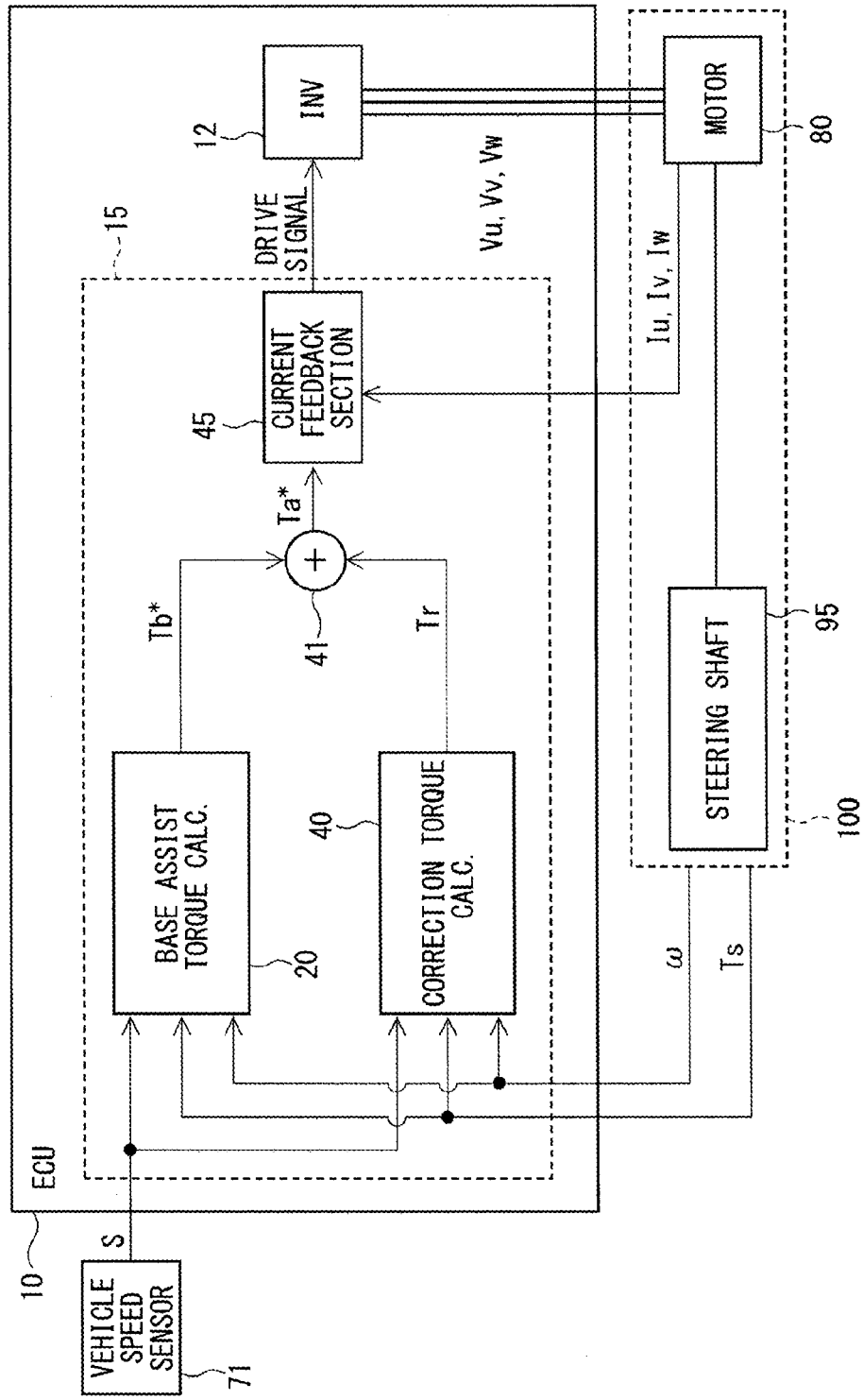
FIG. 2 is a block diagram of an electronic control unit (ECU) in the first embodiment of the present disclosure.

The ECU 10 is provided with an inverter 12 and a control unit 15 that serves as a steering controller as shown in FIG. 2. The inverter 12 is the three-phase inverter, and has switching elements that switch the electric current supplied to each phase coil of the motor 80.

The control unit 15 is a device including a microcomputer, and controls the ON-OFF operation of the switching element of the inverter 12 by Pulse Width Modulation (PWM) control, for example, so that the drive voltages Vu, Vv, and Vw are applied to the motor 80 according to the assist torque instruction Ta*. Thereby, an assist amount, i.e., an amount of the steering force from the motor 80, for assisting the steering operation of the steering wheel 91 by the driver is controlled.

Various processing by the control unit 15 may be performed as a software process by an execution of a stored program in storage devices, e.g., Read-Only Memory (ROM), by Central Processing Unit (CPU), and/or may be performed as a hardware process by a dedicated electronic circuit. The same applies to a control unit 16 mentioned later.

The control unit 15 includes, as function blocks, a base assist torque calculator 20, a correction torque calculator 40, an instruction calculator 41, and a current feedback section 45 and the like.

The base assist torque calculator 20 calculates a base assist torque instruction Tb*. The details of the base assist torque calculator 20 are mentioned later.

The correction torque calculator 40 calculates a correction torque Tr that corrects the base assist torque instruction Tb*.

The correction torque Tr is used for controlling an unwanted operation, e.g., a vibration or the like that is fed back to the steering wheel 91 caused by an unstable behavior of the vehicle, and is calculated based on the steering torque Ts, the motor speed ω, the vehicle speed S, and the like.

By correcting the base assist torque instruction Tb* by using the correction torque Tr, the vehicle behavior is converged appropriately to a stable one, and the controllability, i.e., the operation stability and/or integrity, of the vehicle is realized.

The instruction calculator 41 corrects the base assist torque instruction Tb* by the correction torque Tr, and calculates the assist torque instruction Ta*. The instruction calculator 41 of the present embodiment is an adder, and the assist torque instruction Ta* is calculated by adding the correction torque Tr to the base assist torque instruction Tb*.

The current feedback section 45 generates a drive signal that controls an ON-OFF operation of the switching element of the inverter 12, so that the assist torque according to the assist torque instruction Ta* is provided to the steering shaft 95.

In detail, the current feedback section 45 calculates a current instruction value supplied on the motor 80 based on the assist torque instruction Ta*. Further, the current feedback section 45 obtains, from a non-illustrated current sensor, a detection value concerning each of phase currents Iu, Iv, and Iw supplied to each phase coil of the motor 80.

The current feedback section 45 calculates a voltage instruction value, and generates a drive signal that controls the ON-OFF operation of the switching element based on the voltage instruction value, so that the phase currents Iu, Iv, and Iw fed back from the motor 80 converges to the current instruction value.

By turning the switching element of the inverter 12 ON and OFF based on the generated drive signal, drive voltages Vu, Vv, and Vw according to the assist torque instruction Ta* are applied to the motor 80. Thereby, the torque according to the assist torque instruction Ta* is outputted from the motor 80, and the operation of the steering wheel 91 by the driver is assisted with such a torque being output from the motor 80 and applied to the steering shaft 95.

Hereafter, the calculation of the base assist torque instruction Tb* in the base assist torque calculator 20 is described.

Based on the steering torque Ts, the motor speed ω, the vehicle speed S, etc., the base assist torque calculator 20 calculates the base assist torque instruction Tb* for realizing a sense of transmission of the steering force against the road surface load as well as realizing a steering feel that accords with the steering state.

More practically, the base assist torque instruction Tb* is calculated, so that (a) the driver of the vehicle could feel/get sufficient feedback from the vehicle behavior and from the road surface by semi-stably conveying the reaction force from the road surface, and (b) the steering feel of the steering wheel 91 is improved by adjusting and/or producing an appropriate operation feel of the steering wheel 91 which is fed back to the driver's hand.

That is, the operation feel of the steering wheel 91 fed back to the driver's hand includes what is sensed by the driver as stiffness/rigidity, viscosity, and weightiness of the steering system mechanism 100, and the adjustment of those characteristics may be used to improve and produce a "right (i.e., true to an actual steer state)" and appropriate operation feel of the steering wheel 91.

Figure 3:
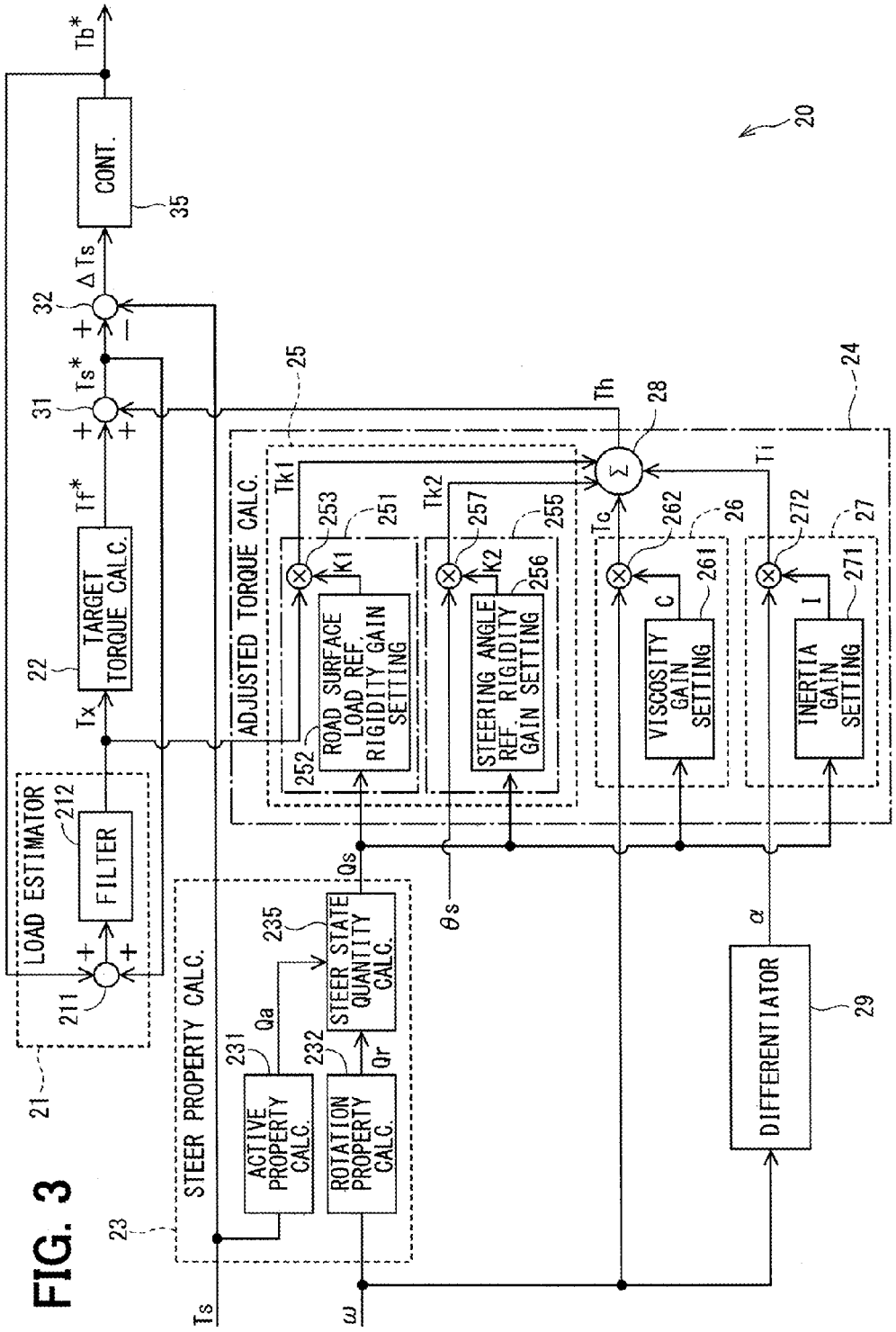
FIG. 3 is a block diagram of a base assist torque calculator in the first embodiment of the present disclosure.

As shown in FIG. 3, the base assist torque calculator 20 includes a load estimator 21, a target torque calculator 22, a steer property calculator 23, an adjusted torque (i.e., compensation value) calculator 24, a target steering torque calculator 31 that serves as an adjuster, a deviation calculator 32, a control section 35 and the like.

The load estimator 21 has an adder 211 and a filter 212, and estimates the road surface load according to the road surface reaction force.

The adder 211 adds the base assist torque instruction Tb* and a target steering torque Ts*. The filter 212 is a low-pass filter that extracts a low-frequency component in a band that is equal to or lower than a certain frequency from the addition value, i.e., a sum, of the base assist torque instruction Tb* and the target steering torque Ts*. The extracted frequency component is designated as a load torque Tx. The load torque Tx is a torque according to the road surface load.

The target torque calculator 22 calculates a base target steering torque Tf* that is a base component of the target steering torque Ts*, i.e., a target value of the steering torque Ts, based on the load torque Tx and the vehicle speed S that are outputted from the load estimator 21.

The steer property calculator 23 includes an active property calculator 231, a rotation property calculator 232, and a steer state quantity calculator 235, and calculates a steer state quantity Qs based on an active property Qa and a rotation property Qr.

The steer state quantity Qs is an index of the steering operation (i.e., the steering state) of the steering wheel 91 by the driver, which enables a determination of whether the steering state is at least one of a steer-away state (i.e., a steering wheel steered away from a neutral position), a steer-back state (i.e., a steering wheel steered back to the neutral position), and a stay-still state (i.e., a steering wheel kept in a stationary state, i.e., unmoved).

In the present embodiment, the steer state quantity Qs takes a non-dimensional value between −1 and +1 (i.e., $-1 \leq Qs \leq +1$), indicating that the steer state is (i) the stay-still state when Qs is within a certain range including zero, (ii) the steer-away state when Qs is/gets close to 1, and (iii) the steer-back state when Qs is/gets close to −1.

The details of the calculation of the steer state quantity Qs are mentioned later.

The adjusted torque calculator 24 calculates an adjusted torque Th that adjusts the feel provided for the hand of the driver based on the steer state quantity Qs. The adjusted torque Th is used to adjust the mechanical impedance that specifies a relationship between the steering torque Ts and a steering angle θs in the steering system mechanism 100, and is calculated based on rigidity adjust torques Tk1, Tk2, a viscosity adjust torque Tc, and an inertia adjust torque Ti, all of which are respectively based on the steer state quantity Qs.

The adjusted torque calculator 24 has a rigidity adjuster 25, a viscosity adjuster 26, an inertia adjuster 27, and an adder 28.

The rigidity adjuster 25 calculates the rigidity adjust torques Tk1, Tk2 for adjusting rigidity characteristics of the steering system mechanism 100, and includes a road surface load reference rigidity adjuster 251 and a steering angle reference rigidity adjuster 255.

The road surface load reference rigidity adjuster 251 has a road surface load reference rigidity gain setting part 252 and a multiplier 253.

The road surface load reference rigidity gain setting part 252 calculates a road surface load reference rigidity gain K1 for adjusting the rigidity characteristics provided for the driver at the time of operation of the steering wheel 91 based on the steer state quantity Qs and the vehicle speed S. The road surface load reference rigidity gain K1 is calculated by using a road surface load reference rigidity adjustment map prepared beforehand.

The multiplier 253 multiplies the load torque Tx by the road surface load reference rigidity gain K1, and calculates a road surface load reference rigidity adjust torque Tk1. That is, the road surface load reference rigidity gain K1 is a value equivalent to the rigidity component of the mechanical impedance in the steering system mechanism 100, and may be considered as an adjustment gain for the road surface load.

The steering angle reference rigidity adjuster 255 has a steering angle reference rigidity gain setting part 256 and a multiplier 257.

The steering angle reference rigidity gain setting part 256 calculates a steering angle reference rigidity gain K2 for adjusting the rigidity characteristics provided for the driver at the time of operation of the steering wheel 91 based on the steer state quantity Qs and the vehicle speed S. The steering angle reference rigidity gain K2 is calculated by using a steering angle reference rigidity adjustment map prepared beforehand.

The multiplier 257 multiplies the steering angle θs by the steering angle reference rigidity gain K2, and calculates a steering angle reference rigidity adjust torque Tk2. That is, the steering angle reference rigidity gain K2 is a value equivalent to a rigidity component of the mechanical impedance in the steering system mechanism 100, and may be considered as an adjustment gain for the steering angle θs.

The rigidity gain K1 and K2 are set up to (i) be equal to zero when the steer state quantity Qs is equal to zero, (ii) be increased when the steer state quantity Qs comes close to 1, and (iii) be decreased when the steer state quantity Qs comes close to −1. The steering feel becomes stably firm when the rigidity in the steer-away state is increased. Further, the forcefully-returning feel in the steer-back state is reduced by decreasing the rigidity in the steer-back state, because the returning of the steering wheel 91 back to the neutral position becomes less steep, i.e., becomes more gentle, by such adjustment.

Further, the steering angle reference rigidity gain K2 may be set up to (i) be equal to zero when the steer state quantity Qs is equal to zero, (ii) be decreased when the steer state quantity Qs comes close to 1, and (iii) be increased when the steer state quantity Qs comes close to −1. That is, by setting the lower rigidity for the steer-away state, the excessively-strong feedback feel to the hand is prevented. Further, by increasing the rigidity in the steer-back state, the steering wheel 91 becomes more easily returnable to the neutral/center position.

The viscosity adjuster 26 calculates the viscosity adjust torque Tc for adjusting the viscosity characteristics of the steering system mechanism 100, and has a viscosity gain setting part 261 and a multiplier 262.

The viscosity gain setting part 261 calculates a viscosity gain C for adjusting the viscosity characteristics provided for the driver at the time of operation of the steering wheel 91 based on the steer state quantity Qs and the vehicle speed S. The viscosity gain C is calculated by using a viscosity adjustment map prepared beforehand.

The multiplier 262 multiplies the motor speed ω by the viscosity gain C, and calculates the viscosity adjust torque Tc. In view of the fact that the motor speed ω is convertible to the steering speed based on the gear ratio of the deceleration mechanism 85, the viscosity gain C is a value equivalent to the viscosity component of the mechanical impedance in the steering system mechanism 100, and is thus considered as an adjustment gain for the steering speed.

The viscosity gain C is set up to (i) be equal to zero when the steer state quantity Qs is equal to zero, (ii) be decreased when the steer state quantity Qs comes close to 1, and (iii) be increased when the steer state quantity Qs comes close to −1. Note that the viscosity gain C for the steer state quantity Qs of 0 may be other than 0, i.e., the zero point of the viscosity gain C may be shifted away from 0. By decreasing the viscosity in the steer-away state, the excessive viscosity characteristics when the steering wheel 91 is deeply/farther turned are reduced, which provides a comfortable and crisp steering feel for the driver. Further, by increasing the viscosity in the steer-back state, the returning of the steering wheel 91 becomes less steep and more gentle, thereby providing more convergence to the steering operation.

Further, the viscosity gain C is set up according to the vehicle speed S.

The inertia adjuster 27 calculates the inertia adjust torque Ti for adjusting the inertia characteristics of the steering system mechanism 100, and has an inertia gain setting part 271 and a multiplier 272.

The inertia gain setting part 271 calculates an inertia gain I for adjusting the inertia characteristics provided for the driver at the time of operation of the steering wheel 91 based on the steer state quantity Qs. The inertia gain I is calculated by using an inertia adjustment map prepared beforehand.

The multiplier 272 multiplies, by the inertia gain I, a motor acceleration α calculated by differentiating the motor speed ω with a differentiator 29, and calculates the inertia adjust torque Ti. That is, the inertia adjust torque Ti is a value equivalent to the inertia component of the mechanical impedance in the steering system mechanism 100, and may be considered as an adjustment gain for the motor acceleration α.

The inertia gain I is set as a negative constant value in a minute operation region, which is defined as a range of very small operation including the steer state quantity Qs of zero. Further, when the steer state quantity Qs is equal to or greater than a preset positive value or is equal to or smaller than a preset negative value, the inertia gain I is set as a positive constant value. In a range between a positive side threshold of the minute operation region and the preset positive value at which the inertia gain I starts to take a constant value and in a range between a negative side threshold of the minute operation region and the preset negative value at which the inertia gain I starts to take a constant value, as an absolute value of the steer state quantity Qs increases, the inertia gain I is configured to increase in proportion to the increase of Qs. Note that the inertia gain I may be configured to be set according to the vehicle speed S.

By setting the inertia gain I to the negative constant value in the minute operation region, excessive inertia characteristics resulting from the inertia of the motor 80 in the minute operation region are reduced, thereby providing a natural steering feel for the driver. Further, when the steering wheel 91 is operated to go beyond the minute operation region, an appropriate inertia is provided for the steering operation, thereby realizing the steering feel that corresponds to the reaction component accompanying the force from the inertia.

The adder 28 adds the rigidity adjust torques Tk1, Tk2, the viscosity adjust torque Tc, and the inertia adjust torque Ti, and calculates the adjusted torque Th.

The target steering torque calculator 31 adjusts the base target steering torque Tf* by the adjusted torque Th, and calculates the target steering torque Ts*. The target steering torque calculator 31 of the present embodiment is an adder, and adds the adjusted torque Th to the base target steering torque Tf*, and calculates the target steering torque Ts*.

The deviation calculator 32 calculates a torque deviation ΔTs that is a deviation between the target steering torque Ts* and the steering torque Ts detected with the torque sensor 94.

The control section 35 calculates the base assist torque instruction Tb* so that (i) the torque deviation ΔTs converges to zero, and (ii) the steering torque Ts follows the target steering torque Ts*.

Hereafter, the calculation of the steer state quantity Qs is described.

Figure 4:
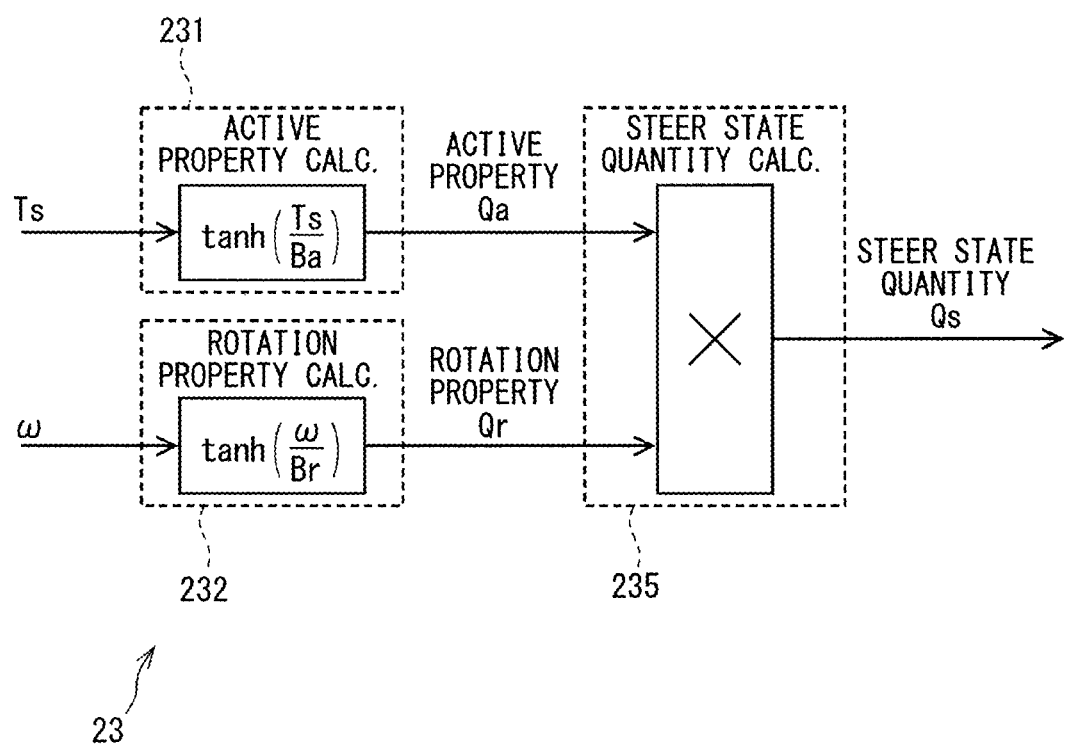
FIG. 4 is a block diagram of a steer property calculator in the first embodiment of the present disclosure.

As shown in FIG. 4, the steer property calculator 23 includes an active property calculator 231, a rotation property calculator 232, and a steer state quantity calculator 235.

The active property calculator 231 calculates the active property Qa based on the steering torque Ts. The active property Qa is an index of an application direction of the torque to the steering shaft 95. In the present embodiment, when the active property Qa comes close to a first torque determination value T1, the torque is applied to the steering shaft 95 in the positive direction i.e., to rotate the shaft 95 to the left (see [0016]), and when the active property Qa comes close to a second torque determination value T2, the torque is applied to the steering shaft 95 in the negative direction i.e., to rotate the shaft 95 to the right (see [0016]). In the present embodiment, the first torque determination value T1 is set to 1, and the second torque determination value T2 is set to −1.

The calculation of the active property Qa is performed by an active property calculation function that continuously interpolates the first torque determination value T1 and the second torque determination value T2 based on the steering torque Ts.

The rotation property calculator 232 calculates the rotation property Qr based on the motor speed ω. The rotation property Qr is an index of the rotation direction of the steering shaft 95.

In the present embodiment, when the rotation property Qr comes close to a first rotation determination value R1, the steering shaft 95 is rotated to the positive direction, and when the rotation property Qr comes close to a second rotation determination value R1, the steering shaft 95 is rotated to the negative direction. In the present embodiment, the first rotation determination value R1 is set to 1, and the second rotation determination value R2 is set to −1.

The calculation of the rotation property Qr is performed by a rotation property calculation function that continuously interpolates the first rotation determination value R1 and the second rotation determination values R2 based on the motor speed ω.

The steer state quantity calculator 235 calculates the steer state quantity Qs based on the active property Qa and the rotation property Qr.

The steer state quantity calculator 235 of the present embodiment is a multiplier, and the steer state quantity Qs is a product of the active property Qa and the rotation property Qr.

The active property calculation function of the present embodiment is a function saturating to the first torque determination value T1 and to the second torque determination value T2. Such a function is considered as being within a notion of "a function that continuously interpolates the first torque determination value and the second torque determination value."

On the other hand, a step function, for example, determining that the steering toque Ts is the second torque determination value T2 for Ts<0, the steering torque Ts=0 for Ts of 0, and the steering torque Ts is the first torque determination value T1 for Ts>0, i.e., outputting a step shape calculation result, is not considered as being within a notion of "a function that continuously interpolates the first torque determination value and the second torque determination value." Note that, in consideration of each of the calculations by the steer property calculator 23 yielding discrete calculation results, a very small discontinuity of the calculation result may be allowed as long as the discontinuity is sufficiently small relative to the difference/deviation between the first torque determination value T1 and the second torque determination value T2.

The same applies to the rotation property calculation function. Further, instead of using a function, a map may also be used for such calculation, as described later in the second embodiment.

Figure 5A:
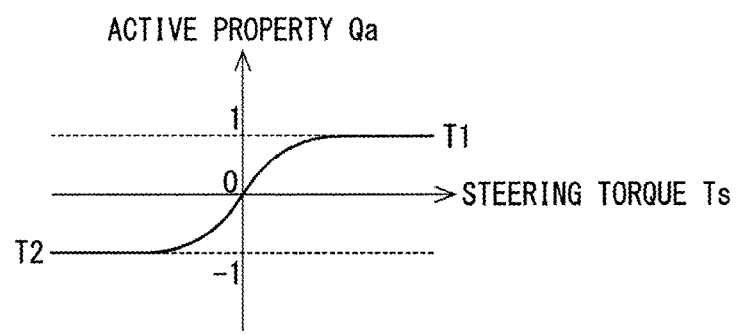
FIG. 5A is an illustration diagram of an active property in the first embodiment of the present disclosure.
Figure 5B:
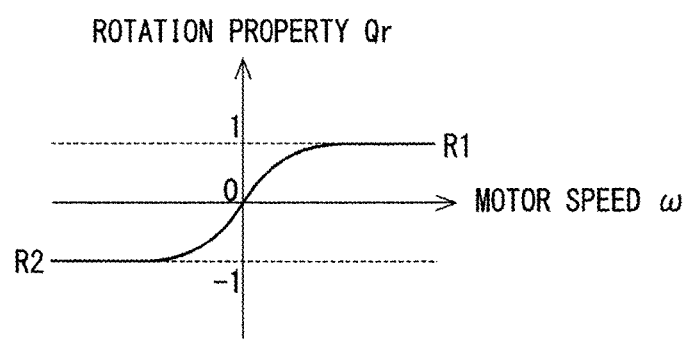
FIG. 5B is an illustration diagram of a rotation property in the first embodiment of the present disclosure.

The active property calculation function and the rotation property calculation function of the present embodiment are functions that use a hyperbolic tangent (i.e., tan h), and the active property Qa and the rotation property Qr are calculated by equations (1-1) and (1-2). Terms Ba and Br in the equations are adjustment constants that specify an inclination in a range between −1 and +1, and the adjustment constants may be set up arbitrarily. Further, the active property Qa calculated by the equation (1-1) is shown in FIG. 5A, and the rotation property Qr calculated by the equation (1-2) is shown in FIG. 5B. The properties Qa and Qr calculated by the equations may be understood as respectively representing an amount/quantity, i.e., a quantified state, of the activity, i.e., the steering operation, of the driver and an amount/quantity of the rotation of the steering shaft 95.

$$Qa = \tanh(Ts/Ba) \tag{1-1}$$

$$Qr = \tanh(\omega/Br) \tag{1-2}$$

Further, the active property calculation function or the rotation property calculation function may be a function that uses a signum. The active property Qa and the rotation property Qr that are calculated by using the signum are shown in equations (2-1) and (2-2). The term "sgn(X)" in the equations is a function that takes out a sign of X. Further, the terms τa and τb are adjustment constants that specify an inclination in a range from −1 to +1.

$$Qa = sgn(Ts) - sgn(Ts) \cdot \exp^{-sgn(Ts) \cdot Ts/\tau a} \tag{2-1}$$

$$Qr = sgn(\omega) - sgn(\omega) \cdot \exp^{-sgn(\omega) \cdot \omega/\tau r} \tag{2-2}$$

Further, the active property calculation function or the rotation property calculation function may be a function that uses an error function. The active property Qa and the rotation property Qr that are calculated by using the error function are shown in equations (3-1) and (3-2). A definition of the error function is shown in an equation (3-3). All of the terms Ca, Cr, Da, Dr are adjustment constants that specify an inclination in a range from −1 to +1, which are real numbers. Further, the term t in the equation (3-3) is an intermediate variable of integration.

$$Qa = \text{erf}\left(\frac{Ts - Ca}{\sqrt{2Da^2}}\right) \tag{3-1}$$

$$Qr = \text{erf}\left(\frac{\omega - Cr}{\sqrt{2Dr^2}}\right) \quad (3\text{-}2)$$

$$\text{erf}(x) = \frac{2}{\sqrt{\pi}} \int_0^x e^{-t^2} dt \quad (3\text{-}3)$$

The active property calculation function and the rotation property calculation function of the present embodiment respectively pass an origin of the graph, and are point-symmetric to the origin. Further, the active property calculation function is a function that smoothly connects the first torque determination value T1 and the second torque determination value T2. Now, a noise component in the steering torque Ts makes the calculation of the "step-shape" active property calculation function non-deterministic, i.e., yields a vibrant active property Qa that sticks either to the first torque determination value T1 or the second torque determination value T2 with frequent changes, if such a noise component rides on the signal at or around the change point of the active property Qa. Also, in a state of frequent sign (+/−) changes of the steering torque Ts, e.g., when the vehicle is traveling a straight path with the steering wheel 91 kept substantially unsteered, the active property Qa may be calculated as a vibrant value.

Therefore, in the present embodiment, vibration of the active property Qa is controlled by calculating the active property Qa by using an active property calculation function that smoothly connects the first torque determination value T1 and the second torque determination value T2.

The rotation property calculation function is a function that smoothly connects the first rotation determination value R1 and the second rotation determination value R2. Now, a noise component in the motor speed ω makes the calculation of the "step-shape" rotation property calculation function non-deterministic, i.e., yields a vibrant rotation property Qr that sticks either to the first rotation determination value R1 or to the second rotation determination value R2 with frequent changes, if such a noise component rides on the signal at or around the change point of the rotation property Qr. Also, in a state of frequent sign (+/−) changes of the motor speed ω, e.g., when the vehicle is traveling a straight path with the steering wheel 91 kept substantially unsteered, the rotation property Qr may be calculated as a vibrant value.

Therefore, in the present embodiment, vibration of the rotation property Qr is controlled by calculating the rotation property Qr by using a rotation property calculation function that smoothly connects the first rotation determination value R1 and the second rotation determination value R2.

Further, instead of using the steering torque Ts itself as the active property Qa, by calculating the active property Qa as a conversion value that is derived from a conversion of the steering torque Ts by using an active property calculation function that is set up by adaptation or the like, the application direction of the torque is appropriately determinable.

Similarly, instead of using the motor speed ω itself as the rotation property Qr, by calculating the rotation property Qr as a conversion value that is derived from a conversion of the motor speed ω by using the rotation property calculation function that is set up by adaptation or the like, the rotation direction of the motor 80 is appropriately determinable.

That is, in the active property Qa and the rotation property Qr of the present embodiment, adjustment factors are included such as the conversion value by using the active/rotation property calculation function and the arbitrarily-set adjustment constants in those functions.

Figure 6:
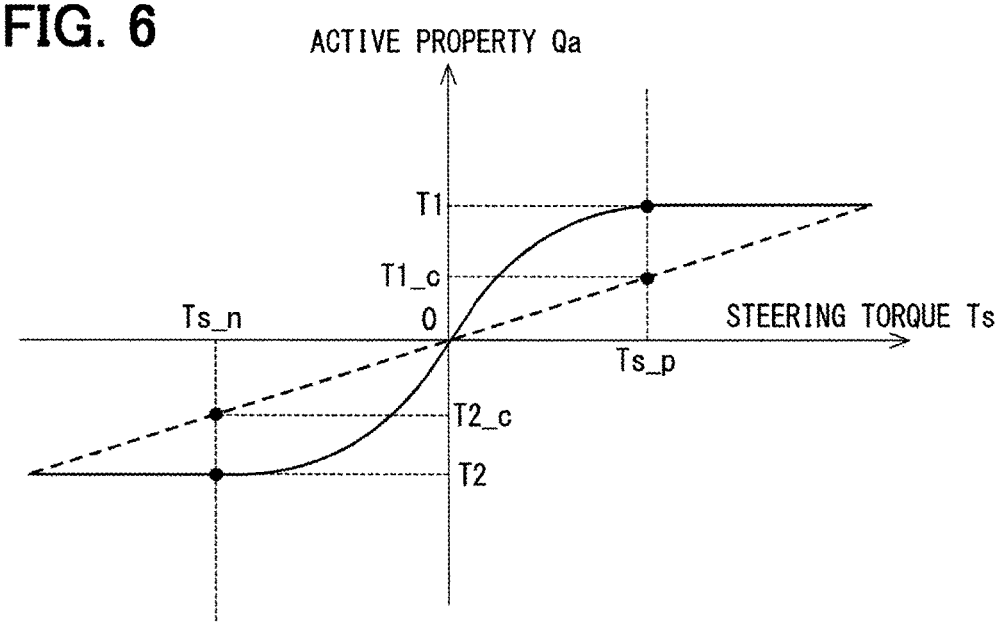
FIG. 6 is an illustration diagram of the active property in a reference example.

FIG. 6 shows a reference example of the active property Qa represented by a broken line of interpolation, which is based on an assumption that the maximum torque is input for the rotation in the right direction to have the active property Qa of −1 and the maximum torque is input for the rotation in the left direction to have the active property Qa of 1. A solid line in FIG. 6 represents the active property Qa of the present embodiment, which is the same as that of FIG. 5A.

As shown in FIG. 6, when the steering torque Ts takes a positive value Ts_p, for example, by using the active property calculation function of the present embodiment, the active property Qa saturates to the first torque determination value T1 (i.e., saturates to a value of 1). In contrast, the active property Qa of the reference example for the same steering torque Ts_p takes a value T1_c that has a smaller absolute value than the first torque determination value T1.

Further, when the steering torque Ts takes a negative value Ts_n, by using the active property calculation function of the present embodiment, the active property Qa saturates to the second torque determination value T2 (i.e., saturates to a value of −1). In contrast, the active property Qa of the reference example for the same steering torque Ts_n takes a value T2_c that has a smaller absolute value than the second torque determination value T2.

In the present embodiment, by the adjustment of the active property calculation function and the constant used therein, the sensitivity of the active property Qa against the steering torque Ts is adjustable. In the example of FIG. 6, by using a function that has a large inclination for a value of the steering torque Ts around zero, the sensitivity to the switching of the application directions of the steering torque Ts is raised. In other words, when the application direction of the steering torque Ts is switched and the "sign (+/−)" change of the steering torque Ts is caused in the present embodiment, the active property Qa quickly and smoothly, i.e., asymptotically, approaches either to the first torque determination value T1 or to the second torque determination value T2 by the use of a carefully-chosen active property calculation function. In such manner, the application direction of the steering torque Ts is appropriately determinable.

Similar to the above, the rotation property Qr has an adjustable sensitivity to the motor speed ω, by the adjustment of the rotation property calculation function and the constant used therein. In the present embodiment, by using a function that has a large inclination for a value of the motor speed ω around zero, the sensitivity to the switching of the rotation directions of the motor 80 is raised. In other words, when the "sign (+/−)" of the motor speed ω changes, the rotation property Qr quickly and smoothly, i.e., asymptotically, approaches either to the first rotation determination value R1 or to the second rotation determination value R2 by the use of a carefully-chosen rotation property calculation function. In such manner, the rotation direction of the motor 80 is appropriately determinable.

In the present embodiment, a product of the active property Qa and the rotation property Qr is designated as the steer state quantity Qs. As described above, by the adjustment of the sensitivity of the active property Qa and the rotation property Qr, the adjustment of the sensitivity of the steer state quantity Qs that is the product of Qa and Qr is enabled. In the present embodiment, the active property Qa and the rotation property Qr are calculated so that an inclination of the steer state quantity Qs for a value at or around zero becomes large. In such manner, based on the steer state quantity Qs, the switching of the steering states is quickly determinable.

Figure 7A:
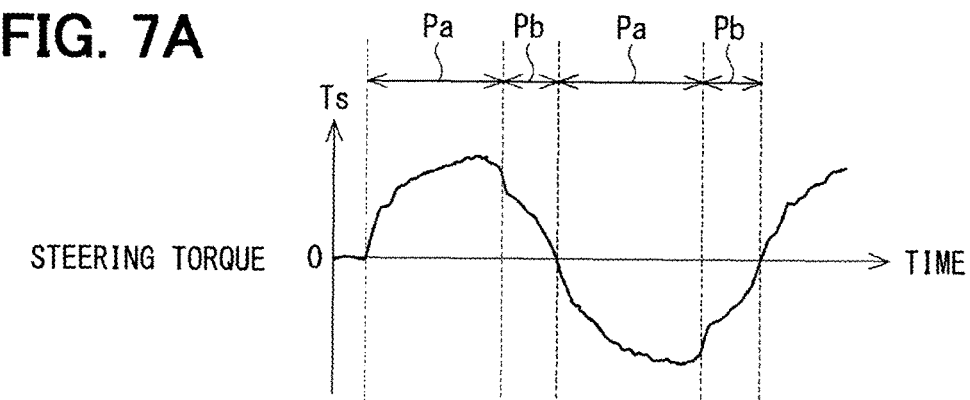
FIGS. 7A, 7B, 7C, 7D are combined time diagrams regarding a steer state quantity in the first embodiment of the present disclosure.
Figure 7B:
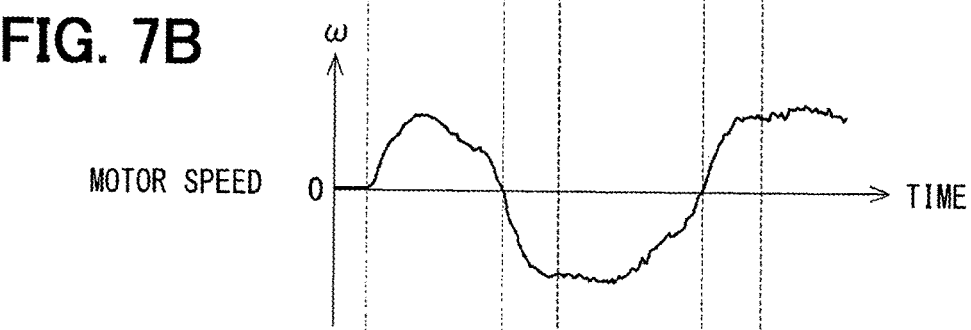
Figure 7C:
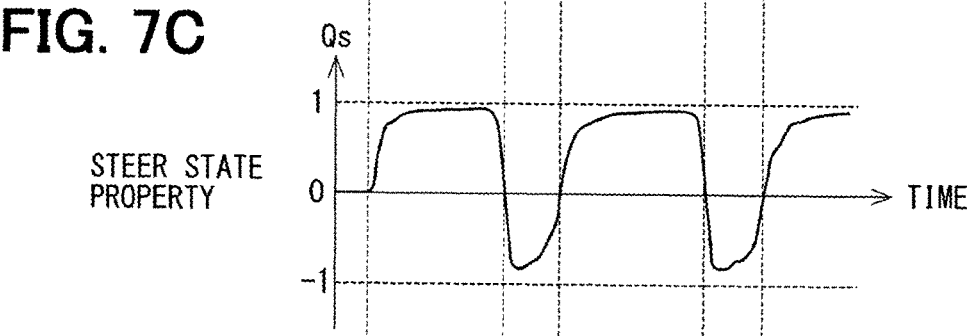
Figure 7D:
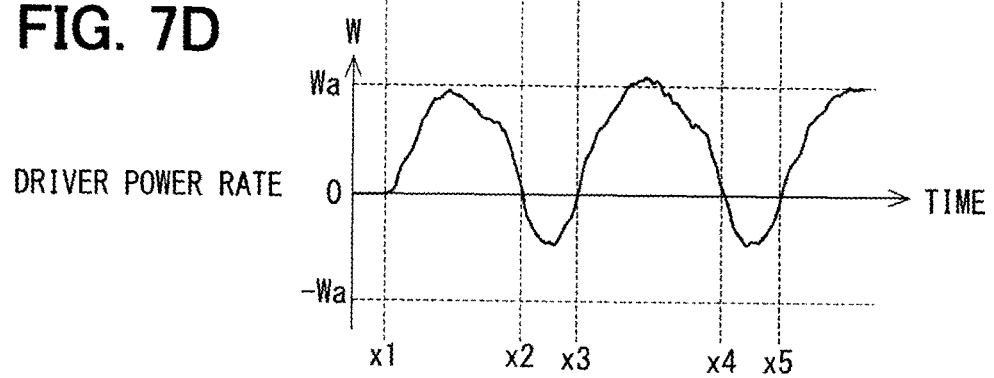

FIGS. 7A, 7B, 7C, 7D are, respectively, a time diagram that shows the result of turning/steering the steering wheel 91 to the left, to the right, and to the left. FIGS. 7A to 7D are combined to show a situation, in which the steering wheel 91 is steered to the left first, and is then steered to the right, and is then steered to the left. In FIGS. 7A to 7D, the horizontal axis is set as the common time axis, and, FIG. 7A shows a graph of the steering torque Ts, and FIG. 7B shows a graph of the motor speed ω, and FIG. 7C shows a graph of the steer state quantity Qs, and FIG. 7D shows a graph of a driver power rate W.

The driver power rate W is a reference example, and is defined as a value that is a product of the steering torque Ts and the motor speed ω. That is, in other words, the driver power rate W is a uniquely-calculable value once the steering torque Ts and the motor speed ω are determined, and does not have any room for the adjustment.

Also, in FIGS. 7A to 7D, a period Pa designates a time when the steering wheel 91 is in the steer-away state, and a period Pb designates a time when the steering wheel 91 is in the steer-back state. Note that when transiting from the steer-away state to the steer-back state, there is certainly a period/moment when the steer state quantity is substantially equal to zero, which may be considered as a moment of the stay-still state. However, in FIGS. 7A to 7D, the stay-still state is omitted from illustration, simplifying the situation to the one that the steer-away state and the steer-back state are directly transitionable to each other without having an intermediate state.

As shown in FIGS. 7A to 7D, in a period from time x1 to time x2, the steering wheel 91 is steered to the left, and the steering state of the steering wheel 91 is the "steer-away state". As shown in FIG. 7D, because of the fact that the driver power rate W is a product of the steering torque Ts and the motor speed ω, the rise characteristics of the driver power rate W depend on the rise characteristics of the steering torque Ts and the motor speed ω. Therefore, the driver power rate W has slower rise characteristics than the steer state quantity Qs shown in FIG. 7C. If, for example, the steering wheel 91 is steered further slowly than the example of FIGS. 7A to 7D, the rise of the driver power rate W is further delayed.

On the other hand, in the present embodiment, since the active property Qa based on the steering torque Ts and the rotation property Qr based on the motor speed ω are separately calculated, the rise characteristics of Qa and the rise characteristics of Qr may be separately/individually adjustable. Therefore, even when the steering wheel 91 is slowly steered, the active property Qa and the rotation property Qr are respectively adjustable so that the steer state quantity Qs quickly rises.

Thus, as shown in FIG. 7C, when the steering wheel 91 is steered at time x1, the steer state quantity Qs quickly, i.e., asymptotically, approaches to 1. Further, at time x2, when the steering state of the steering wheel 91 transitions from the steer-away state to the steer-back state, the steer state quantity Qs quickly, i.e., asymptotically, approaches to −1.

Similarly, at time x3 and time x5 when steering state of the steering wheel 91 transitions from the steer-back state to the steer-away state, the steer state quantity Qs quickly, i.e., asymptotically, approaches to 1, and at time x4 when steering state of the steering wheel 91 transitions from the steer-away state to the steer-back state, the steer state quantity Qs quickly, i.e., asymptotically, approaches to −1.

Further, as shown in FIG. 7A, in the period Pa of the "steer-away" state, the steering torque Ts has an increase trend in which the absolute value of Ts becomes large, while in the period Pb of the "steer-back" state, the steering torque Ts has a decrease trend in which the absolute value of Ts becomes small. Therefore, as shown in FIG. 7D, the absolute value of the driver power rate W becomes smaller in a "steer-back" state period than in a "steer-away" state period. In other words, a difference between (i) the absolute value of the driver power rate W in the steer-away state and (ii) the absolute value of the driver power rate W in the steer-back state is large, which makes it relatively difficult to determine the "steer-back" state.

In FIG. 7D, reference values Wa and −Wa are set at the same absolute value position of the driver power rate W.

In the present embodiment, the steer state quantity Qs is calculated by using the active property Qa calculated by the active property calculation function and the rotation property Qr calculated by the rotation property calculation function. Therefore, as shown in FIG. 7C, the steer state quantity Qs becomes substantially equal to 1 in the "steer-away" state, and becomes substantially equal to −1 in the "steer-back" state.

In other words, a difference between (i) the absolute value of the steer state quantity Qs in the "steer-away" state and (ii) the absolute value of the steer state quantity Qs in the "steer-back" state is small. That is, the steer state quantity Qs more correctly represents both of the "steer-away" state and "steer-back" state of the steering wheel 91 as compared with the driver power rate W.

Further, in consideration of different unit systems between the driver power rate W and the steer state quantity Qs, the ratio of Q1 to Q2 (i.e., Q1/Q2) is closer to 1 than ratio of W1 to W2 (i.e., W1/W2).

In the present embodiment, the rigidity adjust torques Tk1, Tk2, the viscosity adjust torque Tc, and the inertia adjust torque Ti are calculated based on the steer state quantity Qs. As an example, the road surface load reference rigidity adjust torque Tk1 is shown in FIGS. 8A and 8B.

Figure 8A:
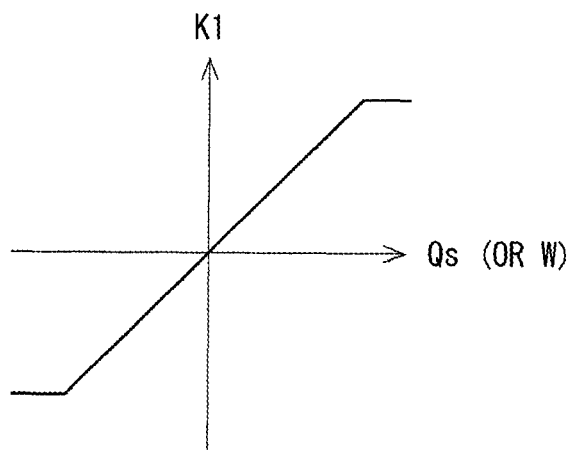
FIGS. 8A, 8B are illustration diagrams of a road surface load reference rigidity adjust torque in the first embodiment of the present disclosure.
Figure 8B:
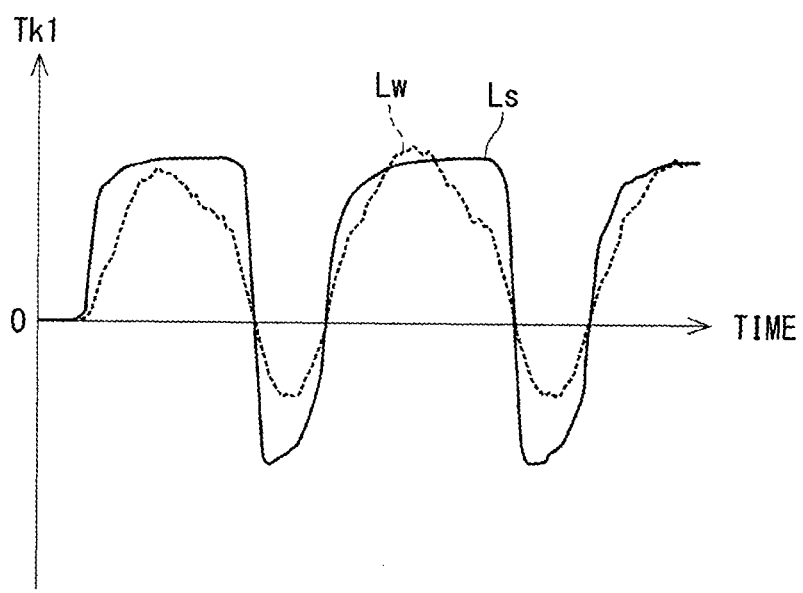

As shown in FIG. 8A, when the steer state quantity Qs or the driver power rate W is positive (i.e., when the steering wheel 91 is in the "steer-away state), the response, i.e., the steering feel, is set to be stably firm by increasing the road surface load reference rigidity gain K1 according to the increase of the steer state quantity Qs.

On the other hand, when the steer state quantity Qs or the driver power rate W is negative (i.e., when the steering wheel 91 is in the "steer-back" state), the steering wheel 91 is set to return gently, by decreasing the road surface load reference rigidity gain K1 according to the decrease of the steer state quantity Qs, which makes the driver feel less forced in the steer-back operation.

The road surface load reference rigidity gain K1 is a value that is set according to the steering state, i.e., according to each of the "stay-still" state, the "steer-away" state, and "steer-back" state, without regard to the steering direction. The same applies to the steering angle reference rigidity adjust torque Tk2, the viscosity gain C, and the inertia gain I.

FIG. 8B shows the result at the time of the same steering operation of the steering wheel 91 as shown in FIGS. 7A to 7D, the horizontal axis is set as the common time axis, and the vertical axis is set as the road surface load reference rigidity adjust torque Tk1.

In FIG. 8B, a solid line Ls represents a value based on the steer state quantity Qs, and a dashed line Lw represents a value based on the driver power rate W.

As shown in FIG. 8B, when the steering wheel 91 is in the steer-away state, the road surface load reference rigidity adjust torque Tk1 in such state quickly increases by the calculation using the steer state quantity Qs in comparison to the calculation using the driver power rate W. Thereby, the more firm response is provided for the driver's hand at the time of the "steer-away state" of the steering wheel 91.

Further, the road surface load reference rigidity adjust torque Tk1 in case the steering wheel 91 is in the "steer-back" state is calculated by using the steer state quantity Qs, which makes the torque Tk1 decrease more quickly and more steeply, in comparison to the calculation of Tk1 by using the driver power rate W.

In other words, the road surface load reference rigidity adjust torque Tk1 is more appropriately calculable by using the steer state quantity Qs according to the steering state. Therefore, when the steering wheel 91 is steered back to the neutral position, the steering wheel 91 returns more gently, making the driver feel less forced in the steer-back operation.

The same applies to the steering angle reference rigidity adjust torque Tk2. Further, by the adjustment of the rigidity component with reference to the steering angle, the same steering feel is enabled according to the steering angle θs without regard to the road surface state and the vehicle speed, which may be especially beneficial for the adjustment of the rigidity feel at the time when the road surface friction coefficient is small.

Although not illustrated, as compared with the calculation by using the driver power rate W, the calculation of the viscosity adjust torque Tc by using the steer state quantity Qs enables a more steep decrease of viscosity in the steer-away time, thereby enabling a crisp steering feel. Further, by quickly increasing the viscosity in the steer-back time, the steering wheel 91 returns more gently, providing more convergence to the steering operation.

Further, by calculating the inertia adjust torque Ti by using the steer state quantity Qs, the inertia force is more appropriately provided according to the steer-away state or according to the steer-back state in comparison to the calculation of the inertia adjust torque Ti by using the driver power rate W, thereby making the steering feel more true to the reactive force.

As described above, the control unit 15 of the present embodiment controls the motor 80 that outputs the assist torque according to the steering torque Ts applied to the steering shaft 95, which is connected with the steering wheel 91, and is provided with the steer property calculator 23, the adjusted torque calculator 24, and the instruction calculator 41.

The steer property calculator 23 calculates the steer state quantity Qs that is the index of which one of the three steering states the steering wheel 91 is currently in, i.e., in one of the stay-still state, the steer-away state, and the steer-back state, based on the active property Qa that shows the application direction of the torque applied to the steering shaft 95 and the rotation property Qr that shows the rotation direction of the steering shaft 95.

The adjusted torque calculator 24 calculates the adjusted torque Th based on the steer state quantity Qs.

The instruction calculator 41 calculates the assist torque instruction Ta* that is the instruction value concerning the drive of the motor 80 by using the adjusted torque Th. In the present embodiment, the assist torque instruction Ta* is calculated based on the base assist torque instruction Tb* that is the value adjusted by the adjusted torque Th. Note that calculating the assist torque instruction Ta* based on the base assist torque instruction Tb* that is calculated by using the adjusted torque Th means that, i.e., is included in a notion of, "calculating the instruction value concerning the drive of the motor by using the instruction compensation value."

At least one of the active property Qa and the rotation property Qr is the conversion value that is converted from the physical quantity representing the kinetic state of the steering shaft 95 by using the function or the map.

In the present embodiment, the steering torque Ts and the motor speed ω respectively correspond to "the physical quantity representing the motion state of the steering shaft."

In the present embodiment, the active property Qa and the rotation property Qr that are used for the calculation of the steer state quantity Qs include the adjustment factor by not being set directly as the physical quantity representing the motion state of the steering shaft 95 but by being set as the conversion value converted from the physical quantity.

Thereby, the steer state quantity Qs, i.e., the index indicating the steering state as one of the "steer-away" state, the "steer-back" state, and the "stay-still" state of the steering wheel 91 is appropriately calculable. Further, based on the steer state quantity Qs, the adjusted torque Th is appropriately calculable according to the steering state of the steering wheel 91, thereby enabling an appropriate adjustment of the steering feel.

The active property Qa is a conversion value converted from the steering torque Ts. That is, in the present embodiment, the steering torque Ts corresponds to the "steering torque equivalent value."

The active property Qa is calculated with a function or with a map based on the steering torque Ts by continuously interpolating the first torque determination value T1 that shows that the torque is applied to the steering shaft 95 to rotate the shaft 95 to the left and the second torque determination value T2 that shows that the torque is applied to the steering shaft 95 to rotate the shaft 95 to the right. By the continuous interpolation of T1 and T2, the vibration of the active property Qa is reduced.

The active property Qa is calculated by using the function or the map that has the saturation characteristics saturating to the first torque determination value T1 and to the second torque determination value T2. Thereby, the active property Qa is appropriately calculable.

The rotation property Qr is a conversion value converted from the physical quantity, i.e., from the motor speed ω that is the physical quantity that changes according to the rotation speed of the steering shaft 95. That is, in the present embodiment, the motor speed ω corresponds to the "rotation speed equivalent value."

The rotation property Qr is calculated by using the function or the map based on the motor speed ω by continuously interpolating the first rotation determination value R1 that shows that the steering shaft 95 rotates to the left and the second rotation determination value R2 that shows that the steering shaft 95 rotates to the right. By the continuous interpolation of R1 and R2, vibration of the rotation property Qr is reduced.

The rotation property Qr is calculated by using the function or the map that has the saturation characteristics saturating to the first rotation determination value R1 and to the second rotation determination value R2. Thereby, the rotation property Qr is appropriately calculable.

The steer property calculator 23 calculates the steer state quantity Qs based on the product of the active property Qa and the rotation property Qr. Thereby, based on the steer state quantity Qs, the steering state of the steering wheel 91 is appropriately determinable as one of the "steer-away" state, the "steer-back" state, and the "stay-still" state.

The adjusted torque calculator 24 calculates the adjusted torque Th that adjusts the mechanical impedance factor, and has at least one of the rigidity adjuster 25, the viscosity adjuster 26, and the inertia adjuster 27.

The rigidity adjuster 25 calculates the rigidity adjust torques Tk1, Tk2 that adjust the rigidity characteristics of the mechanical impedance of the steering system mechanism 100, based on the steer state quantity Qs.

The viscosity adjuster 26 calculates the viscosity adjust torque Tc that adjusts the viscosity characteristics of the mechanical impedance of the steering system mechanism 100, based on the steer state quantity Qs.

The inertia adjuster 27 calculates the inertia adjust torque Ti that adjusts the inertia characteristics of the mechanical impedance of the steering system mechanism 100, based on the steer state quantity Qs.

The adjusted torque calculator 24 calculates the adjusted torque Th based on at least one of the rigidity adjust torques Tk1, Tk2, the viscosity adjust torque Tc, and the inertia adjust torque Ti.

Thereby, the steering feel is improved by the appropriate adjustment of the rigidity characteristics, the viscosity characteristics, and inertia characteristics based on the steer state quantity Qs.

The rigidity adjuster 25 calculates, as the rigidity adjust torque, at least one of the road surface load reference rigidity adjust torque Tk1 according to the road surface load and the steering angle reference rigidity adjust torque Tk2 according to the steering angle θs. Thereby, the rigidity characteristics are more appropriately adjustable, and the steering feel is improved.

In the present embodiment, the adjusted torque calculator 24 corresponds to the "compensation value calculator", and the adjusted torque Th corresponds to the "instruction compensation value." Further, the steering angle θs corresponds to the "rotation angle of the steering shaft."

Second Embodiment

The second embodiment of the present disclosure is shown in FIG. 9.

In the present embodiment, the steer property calculator 23 of the above-mentioned embodiment is replaced with a steer property calculator 43. Therefore, the description of the present embodiment is focused on such point.

The steer property calculator 43 has an active property calculator 431, a rotation property calculator 432, and a steer state quantity calculator 435.

The active property calculator 431 calculates the active property Qa by performing a map calculation using a preset map MA based on the steering torque Ts. In the present embodiment, the first torque determination value T1 is set to 2, and the second torque determination value T2 is set to −2.

The rotation property calculator 432 calculates the rotation property Qr by the map calculation using a preset map MR based on the motor speed ω. In the present embodiment, the first rotation determination value R1 is set to 2, and the second rotation determination value R2 is set to −2.

The steer state quantity calculator 435 calculates the steer state quantity Qs based on a preset map MS based on the active property Qa and the rotation property Qr.

When the present disclosure is configured to have the above-described arrangement, the same effects as the above-mentioned embodiment are achievable.

Third Embodiment

Figure 10:
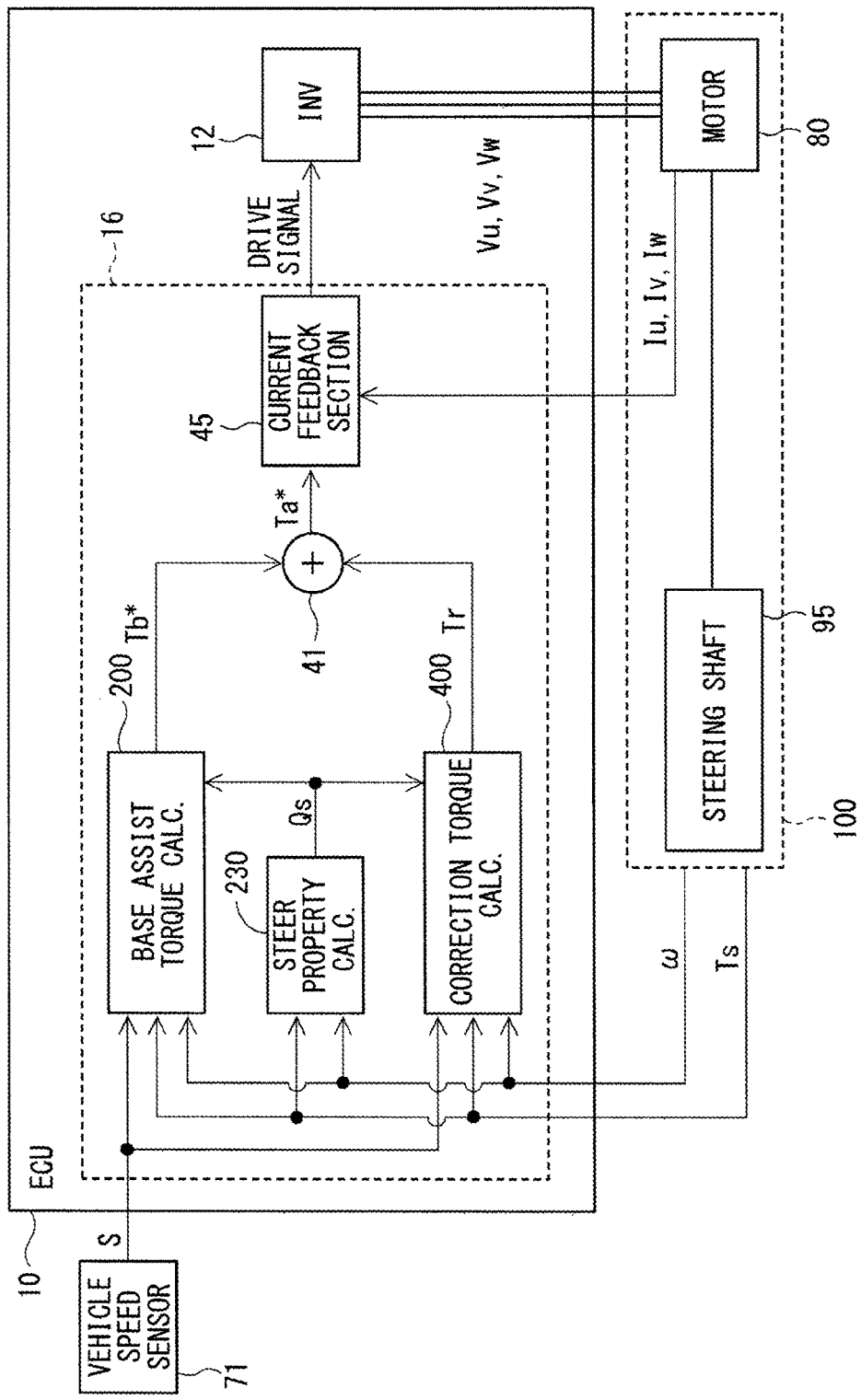
FIG. 10 is a block diagram of the ECU in a third embodiment of the present disclosure.
Figure 11:
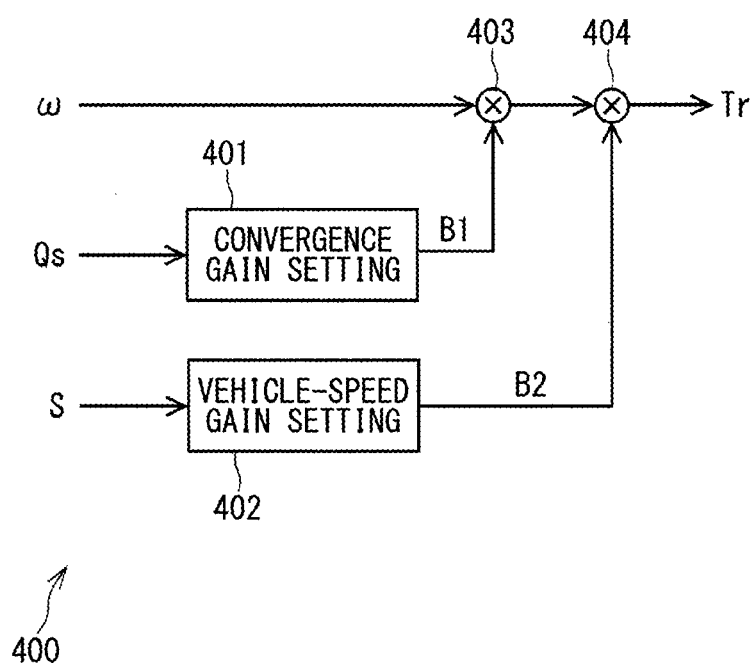
FIG. 11 is a block diagram of a correction torque calculator in the third embodiment of the present disclosure.

The third embodiment of the present disclosure is shown in FIGS. 10 and 11.

As shown in FIG. 10, a control unit 16 as a steering controller of the present embodiment is provided with, as functional blocks, a base assist torque calculator 200, a steer property calculator 230, a correction torque calculator 400, the instruction calculator 41, the current feedback section 45 and the like.

The base assist torque calculator 200 does not have a steer property calculator, and obtains, from the steer property calculator 230, the steer state quantity Qs used by the adjusted torque calculator 24. Regarding the other part, the base assist torque calculator 200 has the same configuration as that of the base assist torque calculator 20 of the first embodiment.

The calculation in the steer property calculator 230 is the same as the calculation in the steer property calculator 23 of the first embodiment. Alternatively, the calculation in the steer property calculator 230 may be configured to be the same as that of the calculation in the steer property calculator 43 of the second embodiment. The steer state quantity Qs calculated by the steer property calculator 230 is outputted to the base assist torque calculator 200 and to the correction torque calculator 400.

As shown in FIG. 11, the correction torque calculator 400 includes a convergence gain setting part 401, a vehicle-speed gain setting part 402, and multipliers 403 and 404, and calculates the correction torque Tr that improves the behavior convergence of the vehicle.

The convergence gain setting part 401 calculates a convergence gain B1 based on the steer state quantity Qs. The convergence gain B1 is set up to have a smaller value as the steer state quantity Qs approaches to 1, and to have a larger value as the steer state quantity approaches to −1.

Thereby, without inhibiting the steering operation of the driver in the "steer-away" time, the behavior convergence of the vehicle is improved in the "stay-still" time and in the "steer-back" time, thereby improving the steering feel.

The vehicle-speed gain setting part 402 calculates a vehicle-speed gain B2 based on the vehicle speed S.

The multiplier 403 multiplies the motor speed ω by the convergence gain B1. The multiplier 404 multiplies the calculation value from the multiplier 403 by the vehicle-speed gain B2, and calculates the correction torque Tr.

The correction torque calculator 400 calculates, as an instruction compensation value, the correction torque Tr based on the steer state quantity Qs and the motor speed ω. By calculating the correction torque Tr based on the steer state quantity Qs, while improving the behavior convergence of the vehicle, the steering feel is improved.

Further, the same effects as the above-mentioned embodiments are also achievable.

In the present embodiment, in addition to the adjusted torque calculator 24 (not illustrated in FIG. 10), the correction torque calculator 400 corresponds to a "compensation value calculator", and the adjusted torque Th and the correction torque Tr correspond to an "instruction compensation value."

Other Embodiments (a) Steer Property Calculator

The active property and the rotation property are calculated by using a function in the first embodiment, and are calculated by using a map in the second embodiment.

However, in other embodiments, the active property may be calculated by using a hyperbolic tangent function, and the rotation property may be calculated by using a signum function, for example. That is, in other words, the active property and the rotation property may be calculated by using different functions. Further, one of the two properties may be calculated by using a function while the other of the two properties may be calculated by using a map.

Further, various other combinations of the calculation methods in terms of use of the functions and the maps may also be in the scope of the present disclosure, such as calculating the active/rotation property by the function while calculating the steer state quantity by the map.

The active property is calculated by a function that passes an origin and saturates to the first/second torque determination values in the first embodiment. However, the function used for the calculation of the active property may not be passing the origin.

In the first embodiment, the first torque determination value is set to 1, and the second torque determination value is set to −1. In the second embodiment, the first torque determination value is set to 2, and the second torque determination value is set to −2. However, in other embodiments, the first torque determination value may be set to a value other than 1 or 2, and the second torque determination value may be set to a value other than −1 or −2.

The same applies to the first rotation determination value and to the second rotation determination value.

The active property calculation function may not have the saturation characteristics.

For example, when the steering torque is larger than the first predetermined value, the active property calculation function may be set to the first torque determination value, and when the steering torque is smaller than the second predetermined value, the active property calculation function may be set to the second torque determination value, and, for a range of the steering torque taking an in-between value of the first/second predetermined values, the active property calculation function may be set as a linear interpolation of the two predetermined values.

The function between the first predetermined value and the second predetermined value may not only be the linear interpolation function that performs a linear interpolation, but also a quadratic function, or a cubic function, or the like, or a function saturating to the first torque determination value and to the second torque determination value, etc.

In such case, in addition to the setup of the function between the first predetermined value and the second predetermined value, the first predetermined value and the second predetermined value themselves serve as the adjustment factor, thereby enabling the adjustment of the inclination of the active property by suitably setting the first predetermined value and the second predetermined value.

In the above-mentioned embodiment, the active property is calculated so that the sensitivity to the switching of the application directions of the steering torque is raised. However, in other embodiments, the active property may be calculated for lowering the sensitivity to the switching.

The same applies to the rotation property calculation function. Further, in case of using the map instead of using the function, the same scheme applies.

When the present disclosure is configured in such manner, the same effects as the above-mentioned embodiments are achievable.

In the above-mentioned embodiment, both of the active property and the rotation property that are used for the calculation of the steer state quantity are the conversion values from the physical quantity representing the motion state of the steering shaft. However, in other embodiments, the active property or the rotation property used for the calculation of the steer state quantity may be the physical quantity (i.e., representing the motion state of the steering shaft) itself.

That is, as long as the rotation property is the conversion value, the active property may be the steering torque itself. Further, as long as the active property is the conversion value, the rotation property may be the rotation speed equivalent value itself.

In the above-mentioned embodiment, the steering torque equivalent value used for the calculation of the active property is the steering torque itself. When the steering torque is controlled to follow the target steering torque as described in the above-mentioned embodiment, the steering torque and the target steering torque take substantially the same value.

Therefore, in other embodiments, the steering torque equivalent value may not be the steering torque itself but may be the target steering torque for achieving the same effects.

Further, in other embodiments, the steering torque equivalent value may be set as (i) the assist torque detection value that is calculated based on the detection value of, e.g., the current detection value or the like, (ii) an estimation value such as the load torque, a rack thrust force, or (iii) the assist torque instruction value and the like, which is a result of a control yielding a target value or an instruction value. Further, in other embodiments, the steering torque equivalent value may be the current instruction value.

In the above-mentioned embodiment, the rotation speed equivalent value used for the calculation of the rotation property is the motor speed. However, in other embodiments, the rotation speed equivalent value may be the steering speed, or other parameters that change according to the steering speed.

Further, the steering torque equivalent value and the rotation speed equivalent value may be set to the instruction value of each of the parameters, to the detection value, or to the estimation value.

In the third embodiment, the steer state quantity calculator is provided separately from the base assist torque calculator and from the correction torque calculator. However, in other embodiments, the steer state quantity calculated by the steer state quantity calculator of the base assist torque calculator may be outputted to the correction torque calculator just like the first embodiment, and the steer state quantity may be used for the calculation of the correction torque.

Further, in other embodiments, the steer state quantity calculator may be provided in the correction torque calculator, and the steer state quantity calculated in the steer state quantity calculator of the correction torque calculator may be outputted to the base assist torque calculator, and the steer state quantity may be used for the calculation of the adjusted torque.

(b) Compensation Value Calculator

In the above-mentioned embodiment, the adjusted torque calculator that is the "compensation value calculator" in the claims calculates the adjusted torque based on each of the road surface load reference rigidity adjust torque, the steering angle reference rigidity adjust torque, the viscosity adjust torque, and the inertia adjust torque that are all calculated based on the steer state quantity.

However, in other embodiments, it is not necessary to calculate one or more of the road surface load reference rigidity adjust torque, the steering angle reference rigidity adjust torque, the viscosity adjust torque, and the inertia adjust torque based on the steer state quantity.

Further, in other embodiments, it is not necessary to use one or more of the road surface load reference rigidity adjust torque, the steering angle reference rigidity adjust torque, the viscosity adjust torque, and the inertia adjust torque for the calculation of the adjusted torque.

In the above-mentioned embodiment, for the calculation of the steering angle reference rigidity adjust torque, the rotation angle of steering which is the rotation angle of the steering wheel is used as the rotation angle of the steering shaft.

However, in other embodiments, the rotation angle of steering used for the calculation of the steering angle reference rigidity adjust torque may be the rotation angle of the motor with a zero reference point defined as an angle of the straight travel time, or the steered angle of the tires, or a rotation angle of any component that is used in the steering system mechanism from the steering wheel to the tires including the motor. Further, the rotation angle of steering operation may not only be the detection angle but also be the estimation angle.

In the above-mentioned embodiment, the adjusted torque calculator that serves as the compensation value calculator outputs the adjusted torque as a torque value that changes the base target steering torque. However, in other embodiments, the adjusted torque calculator may convert the adjusted torque to an electric-current value, and the adjusted torque conversion value may be output for correcting the current instruction value.

In the third embodiment, the correction torque calculator calculates the correction torque by multiplying the rotation speed equivalent value by the convergence gain and the vehicle-speed gain. However, in other embodiments, the multiplication value that is derived from multiplication of the rotation speed equivalent value by the convergence gain and the vehicle-speed gain may have other calculation, such as an addition of other values, for having the correction torque. That is, the steer state quantity is not necessarily used for all the calculations in the correction torque calculator. Further, instead of using the convergence gain and the vehicle-speed gain, the correction torque may be calculated (i) by calculating a single convergence gain according to the steer state quantity and the vehicle speed and (ii) by multiplying the rotation speed equivalent value by such a single convergence gain. Further, the vehicle-speed gain may be omitted.

In the third embodiment, the correction torque calculator outputs the correction torque as a torque value that changes the base assist torque instruction. However, in other embodiments, the correction torque calculator may perform an electric-current conversion of the correction torque, and the conversion value may be outputted as the correction torque conversion value for correcting the current instruction value.

That is, "the instruction value concerning the drive of the motor" may not only be the torque instruction value but also the current instruction value. In such case, the compensation value calculator may calculate a value that compensates the current instruction value as an "instruction compensation value."

In the first embodiment, the adjusted torque calculator corresponds to the "compensation value calculator", and, in the third embodiment, the adjusted torque calculator and the correction torque calculator correspond to the "compensation value calculator". However, in other embodiments, only the correction torque calculator may correspond to the "compensation value calculator." That is, for example, it is not necessary to use the steer state quantity for the calculation of the adjusted torque. Further, the adjusted torque calculator may be omitted.

(c) Instruction Calculator

In the above-mentioned embodiment, the base target steering torque is adjusted based on the adjusted torque. Also, in the above-mentioned embodiment, the base assist torque instruction is corrected based on the correction torque. However, in other embodiments, as long as the instruction value adjusted based on the adjusted torque is an instruction value concerning the drive of the motor that assists the driver's steering operation of the steering member, the instruction value under adjustment may be any value other than base target steering torque. Similarly, in other embodiments, as long as the instruction value corrected based on the correction torque is an instruction value concerning the drive of the motor that assists the driver's steering operation of the steering member, the instruction value may be any value other than base assist torque instruction.

The base assist torque instruction and each of the parameters used for the calculation of the base assist torque instruction may be any instruction/parameter, as long as the instruction/parameter is involved in the calculation of the assist torque or in the control of an assist of the steering operation, i.e., not necessarily be the one in the above-described method.

In the above-mentioned embodiment, the base assist torque instruction is corrected by the correction torque, and the assist torque instruction is calculated. However, in other embodiments, the instruction value calculator may be omitted and the base assist torque instruction may be used as the assist torque instruction as it is. In such case, the adjuster corresponds to the "instruction value calculator." Further, as long as the calculation method of the assist torque instruction is involved in the assist of the steering operation of the driver for steering the steering member, any method other than the method in the above-mentioned embodiments may be used.

(d) Steering System

The steering system of the above-mentioned embodiment is a so-called "column assist type" electric power steering system in which the driving force of the motor is transmitted to the steering shaft. However, in other embodiments, the driving force of the motor may be transmitted to the rack, i.e., the system may be a so-called "rack assist type" electric power steering system. Further, in other embodiments, the steering system may be a "steer by wire" system in which the steering wheel and the steering wheel are mechanically separated. Further, the three-phase alternate-current motor in the above-mentioned embodiment may be, in other embodiments, any motor other than the three-phase alternate-current motor.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A steering controller that controls a motor that assists a steering operation of a vehicle, the steering operation performed by applying a steering torque to a steering member that is connected to a steering shaft, the motor outputting an assist torque to the steering shaft to assist the steering torque, the steering controller comprising:
  a steer property calculator calculating a steer state quantity that is an index of a steering state of the steering member based on (a) an active property indicating an application direction of the steering torque that is applied to the steering shaft through the steering member and (b) a rotation property indicating a rotation direction of the steering shaft, the index of the steering state indicating one of (i) a steer-away state, (ii) a steer-back state, and (iii) a stay-still state of the steering member;
  an instruction value calculator calculating an instruction value; and
  a compensation value calculator calculating an instruction compensation value for compensating the instruction value based on the steer state quantity,
  wherein the assist torque is calculated based on the instruction value and the instruction compensation value,
  wherein at least one of the active property and the rotation property is a conversion value that is calculated by converting a physical quantity representing a motion state of the steering shaft by using a function or a map, and
  wherein the compensation value calculator calculates, as the instruction compensation value, an adjusting torque that adjusts a mechanical impedance factor.

2. The steering controller of claim 1, wherein the active property is a conversion value converted from (a) the steering torque that is the physical quantity representing the motion state of the steering shaft, or from (b) a steering torque equivalent value that changes according to the steering torque.

3. The steering controller of claim 2, wherein the active property is calculated based on the steering torque equivalent value, by using a function or a map that continuously interpolates a first torque determination value indicating that the steering torque is applied to rotate the steering shaft in a first direction, and a second torque determination value indicating that the steering torque is applied to rotate the steering shaft in a second direction opposite the first direction.

4. The steering controller of claim 3, wherein the active property is calculated by using a function of a map that has saturation characteristics that saturate to the first torque determination value and to the second torque determination value.

5. The steering controller of claim 1, wherein the rotation property is a conversion value converted from (a) the rotation speed of the steering shaft indicating a physical quantity of the kinetic state, or from (b) a rotation speed equivalent value that changes according to the rotation speed of the steering shaft.

6. The steering controller of claim 5, wherein the rotation property is calculated based on the rotation speed equivalent value by using a function or a map that continuously interpolates a first rotation determination value indicating the rotation of the steering shaft in a first direction, and a second torque determination value indicating the rotation of the steering shaft in a second direction opposite the first direction.

7. The steering controller of claim 6, wherein the rotation property is calculated by using a function or a map that has saturation characteristics that saturate to the first rotation determination value, and to the second rotation determination value.

8. The steering controller of claim 1, wherein the steer property calculator calculates the steer state quantity based on a product of the active property and the rotation property.

9. The steering controller of claim 1, wherein
  the compensation value calculator includes at least one of:
    a rigidity adjuster calculating a rigidity adjust torque for adjusting rigidity characteristics of the mechanical impedance factor about a steering system mechanism including the steering shaft, based on the steer state quantity;
    a viscosity adjuster calculating a viscosity adjust torque for adjusting viscosity characteristics of the mechanical impedance factor about the steering system mechanism, based on the steer state quantity; and
    an inertia adjuster calculating an inertia adjust torque for adjusting inertia characteristics of the mechanical impedance about the steering system mechanism, based on the steer state quantity, and
  the calculation of the adjusted torque is based at least on one of the rigidity adjust torque, the viscosity adjust torque, and the inertia adjust torque.

10. The steering controller of claim 9, wherein the rigidity adjuster calculates, as the rigidity adjust torque, at least one of a road surface load reference rigidity adjust torque according to a road surface load, and a steer angle reference rigidity adjust torque according to a rotation angle of the steering shaft.

11. The steering controller of claim 1, wherein the compensation value calculator calculates, as the instruction compensation value, a correction torque based on (i) the steer state quantity and (ii) (a) a rotation speed of the steering shaft or (b) a rotation speed equivalent value that changes according to the rotation speed of the steering shaft.

12. A steering controller that controls a motor that assists a steering operation of a vehicle, the steering operation performed by applying a steering torque to a steering member that is connected to a steering shaft, the motor outputting an assist torque to the steering shaft to assist the steering torque, the steering controller comprising:
  a steer property calculator calculating a steer state quantity that is an index of the steering state of the steering member based on (a) an active property indicating an application direction of a steering torque that is applied to a steering shaft through the steering member and (b) a rotation property indicating a rotation direction of the steering shaft, the index of the steering state indicating one of (i) a steer-away state, (ii) a steer-back state, and (iii) a stay-still state of the steering member;
  an instruction value calculator calculating an instruction value; and
  a compensation value calculator calculating an instruction compensation value for compensating the instruction value based on the steer state quantity,
  wherein the assist torque is calculated based on the instruction value and the instruction compensation value,
  wherein at least one of the active property and the rotation property is a conversion value that is calculated by converting a physical quantity representing a motion state of the steering shaft by using a function or a map, and
  wherein the compensation value calculator calculates, as the instruction compensation value, an adjusting torque that adjusts a mechanical impedance factor.

13. A steering system for assisting a steering operation of a vehicle, comprising:

a motor for outputting an assist torque to a steering shaft to assist the steering operation of the vehicle;

a steering member connected to the steering shaft to which the motor is also connected; and a steering controller that controls the motor to output the assist torque to assist the steering operation, and the steering operation of the steering member by an application of a steering torque and an application of the assist torque, the steering controller configured to include:

a steer property calculator calculating a steer state quantity that is an index of a steering state of the steering member based on (a) an active property indicating an application direction of a steering torque that is applied to the steering shaft through the steering member and (b) a rotation property indicating a rotation direction of the steering shaft, the index of the steering state indicating one of (i) a steer-away state, (ii) a steer-back state, and (iii) a stay-still state of the steering member;

an instruction value calculator calculating an instruction value; and a compensation value calculator calculating an instruction compensation value for compensating the instruction value based on the steer state quantity, wherein the assist torque is calculated based on the instruction value and the instruction compensation value, wherein at least one of the active property and the rotation property is a conversion value that is calculated by converting a physical quantity representing a motion state of the steering shaft by using a function or a map, and wherein the compensation value calculator calculates, as the instruction compensation value, an adjusting torque that adjusts a mechanical impedance factor.

\* \* \* \* \*